April 15, 1952   J. M. KAHN   2,592,907
COOKING LIQUOR TREATMENT
Filed March 8, 1949   2 SHEETS—SHEET 1
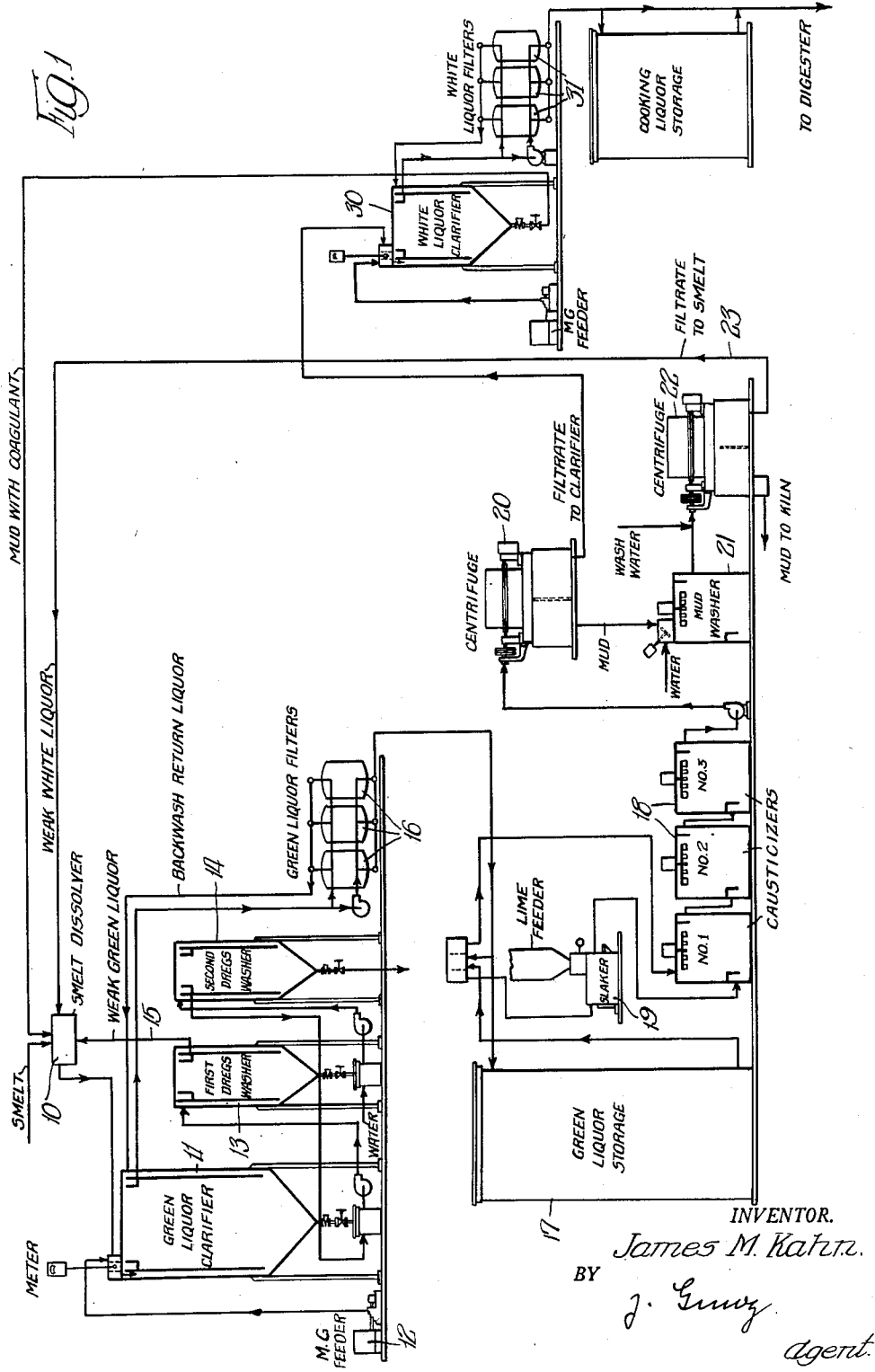
INVENTOR.
James M. Kahn.
BY

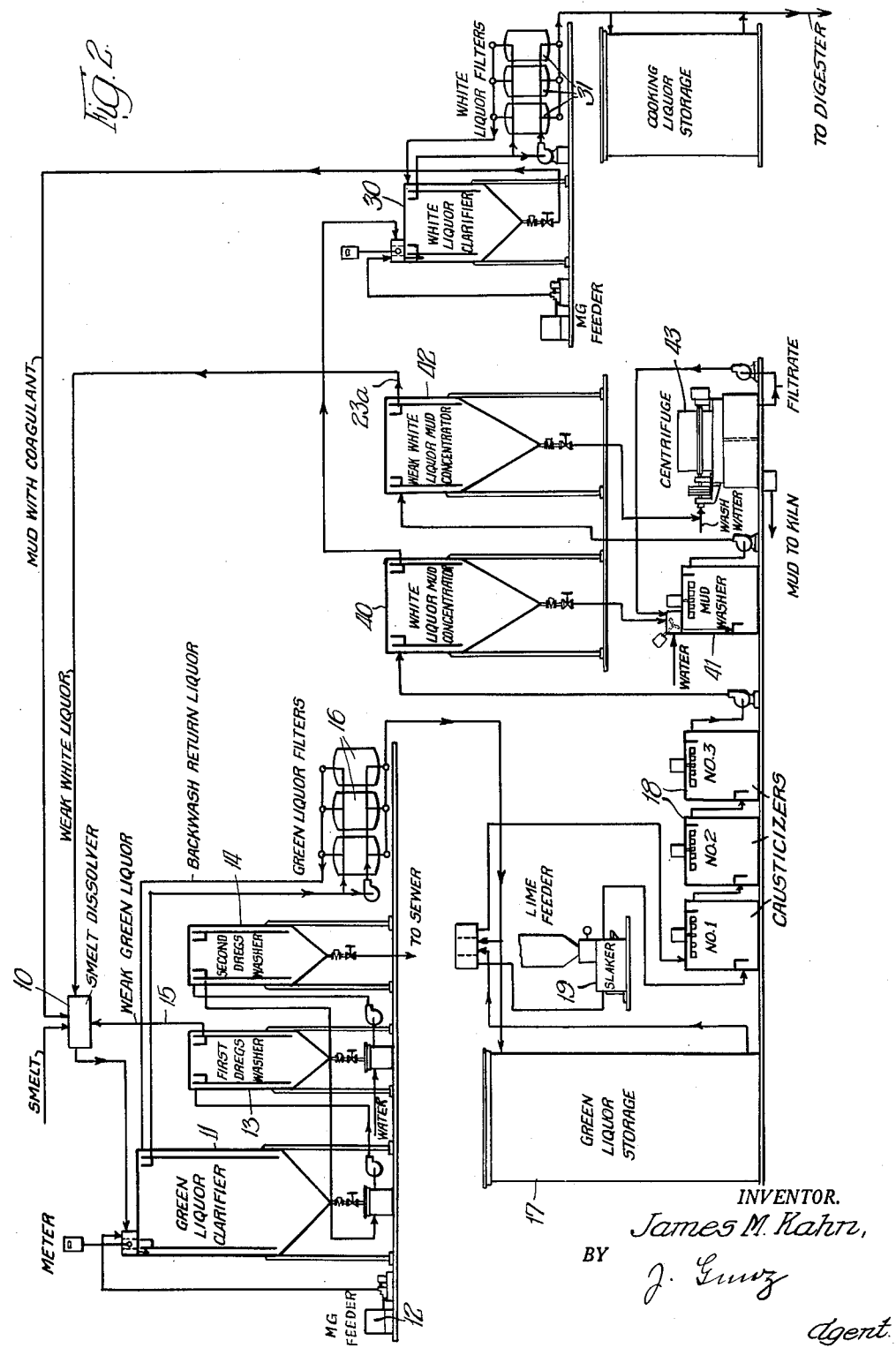

Patented Apr. 15, 1952

2,592,907

UNITED STATES PATENT OFFICE 2,592,907

COOKING LIQUOR TREATMENT

James M. Kahn, Glencoe, Ill., assignor to Infilco Incorporated, Chicago, Ill., a corporation of Delaware Application March 8, 1949, Serial No. 80,290

5 Claims. (Cl. 252—183)

This invention relates to the manufacture of alkaline pulp, such as kraft pulp or soda pulp. More specifically it refers to the treatment of the so-called white liquor produced for the manufacture of alkaline pulp.

In the manufacture of alkaline pulp cellulosic material is digested by heat treatment with a so-called cooking liquor, which is a solution containing mainly caustic soda. After digestion the pulp is separated from the digestion liquor which is commonly called "black liquor." This black liquor contains valuable chemicals, mainly sodium salts, which must be recovered to make the process economical. It contains also a large amount of impurities, particularly iron, which are objectionable and must be removed before the liquor can be reused. The liquor is therefore passed through a series of treating stages wherein it is treated to make it suitable for reuse as cooking liquor. Briefly, in usual practice, black liquor is first concentrated and burned in a recovery furnace. Sodium sulfate is added to the black liquor to be burned in the kraft process, while in the soda process sodium carbonate may be added to the smelt. The smelt resulting from the burning is dissolved and forms what is commonly called "green liquor." The green liquor is causticized with milk of lime to form "white liquor," which is settled and reused as cooking liquor in the digestion of cellulosic material. The settled mud from the white liquor clarification is calcined and reused in the causticizers.

This invention relates to improvements in the last stage of the treatment, that of the causticized white liquor, but has also relation to and effects beneficial results in, the preceding stages of green liquor treatment and causticizing. Thus while one aspect of my invention relates to improving the purification of the white liquor coming from the causticizers, another aspect relates to the convenient disposal of, and the use or recovery of valuable products from, the muds resulting from the purification of the white liquor in preceding stages of the process, with beneficial results in these preceding stages.

It is an object of this invention to provide an improved process for the treatment of white liquor for use in the manufacture of alkaline pulp.

It is a specific object of this invention to first subject causticized white liquor to a treatment whereby there is obtained a thickened, substantially dewatered mud and a turbid liquor, and to then further treat the turbid liquor by coagulation and clarification to obtain a purified white liquor suitable for use as cooking liquor.

It is another object of the invention to centrifuge white liquor and to treat the turbid filtrate from the centrifuge with a magnesium compound to coagulate the turbidity and provide a precipitate which is readily separable from the purified white liquor.

It is a further object of the invention to return the magnesium containing precipitate from the white liquor coagulation or purification stage to the green liquor purification stage where it may assist in the purification of the green liquor and valuable sodium salts may be recovered therefrom.

Another object is a two step purification of white liquor wherein the white liquor is first separated from most of the mud but no effort is made to obtain clarified liquor, and the hard to settle solids are removed in a second step which includes treating of the white liquor with a magnesium compound to coagulate the fine solids to a readily settleable form.

Another object of the invention is to provide a process for the treatment of white liquor, wherein the bulk of the calcium carbonate contained therein is separated in substantially pure and dewatered form suitable for calcining and reuse in the causticizing stage of the process prior to coagulation of the finer particles of calcium carbonate by a magnesium compound.

These and further objects will become apparent from the description and claims which follow.

Heretofore, it has been usual practice in the treatment of digester liquor in the manufacture of alkaline pulp to clarify the so-called green liquor by sedimentation in a clarifier, to causticize the clarified green liquor by adding lime thereto, usually as milk of lime, and to clarify the resulting white liquor by sedimentation, usually in a tray type clarifier. This conventional practice has various drawbacks. Certain improvements in the treatment of the green liquor which effect also improved overall results in the subsequent stages mentioned, can be obtained by purifying the green liquor prior to causticizing it to remove its contents of iron and other impurities by treating the green liquor with a magnesium compound capable of forming in the liquor a precipitate containing magnesium. The precipitated magnesium carries down, or adsorbs, the iron, silica, etc. contained in the green liquor. The precipitate can be easily separated from the purified liquor by sedimentation and can be washed with hot water without redissolving the iron. When the thus treated liquor is causticized and settled, the sludge is substantially pure calcium carbonate which is free of iron and can be used over and over again in the causticizing stage without reintroducing iron compounds into the causticized white liquor.

While the quality of the white liquor is thus improved by the treatment of the green liquor described above the separation of the calcium carbonate sludge from the liquor and clarification of the white liquor by the methods heretofore employed remain cumbersome and unsatisfactory. The calcium carbonate contained in the white liquor is partly in very fine and hard to settle particle form. To obtain proper clarification a very long holding time in the settler had to be provided. This necessitated very large, expensive clarifiers.

The mud obtained from the conventional white liquor clarifiers was not sufficiently dewatered to make its calcining economically feasible without prior further concentration. Therefore, the mud was usually dewatered, as on vacuum filters, or a centrifuge, before being sent to a kiln for calcining.

By treating the white liquor coming from the causticizers by my process, I can obtain better clarification with less costly equipment than was heretofore possible in conventional practice.

I have found that by treating the white liquor in a manner to first separate the bulk of the calcium carbonate in form of a dense, substantially concentrated sludge from the caustic soda solution forming the liquid part of the white liquor without attempting to obtain a clarified liquor, I can separate the balance of the calcium carbonate, constituting the fine, hard to settle particles, in a relatively small clarifier by dosing the caustic soda solution with a small amount of a magnesium compound capable of forming in the white liquor a precipitate containing magnesium. The magnesium compound mixed with the white liquor coagulates the fine particles of calcium carbonate and they settle with the magnesium floc, leaving a clear white liquor which is suitable for use as a cooking liquor. Magnesium hydroxide can be used in this treatment, but better results are obtained with the oxide or with a soluble magnesium salt such as magnesium sulfate, magnesium chloride or magnesium carbonate. The selection of a particular magnesium compound depends on its availability under present day conditions rather than on its specific chemical composition. The quantity of magnesium necessary to form sufficient floc is quite small and may be within the range of from about 5 p. p. m. (parts per million) to about 50 p. p. m. or more, depending on the specific characteristics of the white liquor treated. I have used 20 p. p. m., or approximately 0.15 pound of magnesium equivalent per ton of pulp with very good success.

In operating in this manner I obtain in the first step of my white liquor treatment a substantially pure calcium carbonate sludge suitable for calcining and reuse in the causticizing stage, and in the second step a sludge containing magnesium hydroxide, calcium carbonate and sodium salts. It is of the essence of this invention that these sludges be obtained separately and the bulk of the calcium carbonate not be mixed with magnesium compounds. The sludge from the second step may be returned to the green liquor stage of the process where its magnesium content assists in the purification of the green liquor. While magnesium hydroxide is not as effective in the precipitation or adsorption of the iron contents of the green liquor as are the soluble salts of magnesium, it has some effect and to this extent a smaller quantity of fresh magnesium compounds need be added to the green liquor. Further, the sodium salts contained in the sludge are washed out in the washing step of the green liquor stage and thus recovered and returned to the process with the wash water. There is thus obtained a saving in treating materials in the process as a whole.

The various aspects and advantages of my invention will be more fully understood by reference to the drawings, wherein Figures 1 and 2 show diagrammatically two preferred embodiments of the invention. Both flow sheets show only those stages of the treatment of a digester liquor to produce cooking liquor for reuse in the digestion of cellulosic materials which are directly or indirectly involved in the present process, while the stages preceding the formation of green liquor by dissolving the smelt are not shown.

As shown in Figure 1, the smelt coming from a recovery furnace, not shown, is dissolved in a smelt dissolving tank 10 and then passed into a green liquor clarifier 11. A magnesium compound from chemical feeder 12 is added to and mixed with the green liquor entering the clarifier 11. The dregs settling in green liquor clarifier 11 are discharged therefrom and passed to a first washer 13 and from the first washer 13 to a second washer 14 to recover the sodium salts contained in the dregs. Fresh water is used for washing the sludge in the second washer 14. The overflow from the second washer may be used as washwater in the first washer 13. The overflow of the first washer containing all the sodium salts washed out of the dregs in the first and second washers is returned through a weak green liquor line 15 to the smelt dissolving tank 10. The dregs from the second washer are discharged to waste. These dregs contain the precipitate of magnesium formed in the treatment of the green liquor with a magnesium compound and the iron adsorbed by said precipitate. The green liquor leaving the tank 11 is therefore practically free of iron.

The purified green liquor, as shown in Figure 1, may pass through one or more green liquor filters 16 to remove the last traces of suspended solids. From the filters the green liquor may be passed into a green liquor storage tank 17 and thence to the causticizing stage of the process as shown, or it may be passed directly to the causticizers 18. Three causticizers, arranged in sequence, are shown in the drawings, but it will be obvious that the number of causticizers could be more or less, though preferably at least two will be used. As shown in Figure 1, a portion of green liquor is withdrawn from the flow to the causticizers and is used for slaking the lime used in causticizing, as in a slaker 19.

The flow sheet so far described is not claimed per se as new, but only in so far as the present invention has bearing on it, as will be explained below.

The caustic white liquor leaving the causticizing stage is passed to a suitable dewatering device, such as a centrifuge 20 of the continuous type, as for instance a Bird centrifuge, to separate substantially concentrated mud from the liquid portions of the white liquor. No attempt is made in this first step of the white liquor treatment to obtain clarified liquor. The mud obtained on the centrifuge 20 will have a moisture content of the order of 35% and will to the greatest part be composed of calcium carbonate, but contains also a considerable amount of valuable sodium salts. This mud is washed in a mud washer 21 and may be centrifuged on a second centrifuge 22 to separate the liquid containing the sodium salts from the calcium carbonate sludge. The sludge is then ready to be sent to a kiln, not shown, for calcining and reuse in the causticizing stage. The weak filtrate from the second centrifuge 22 which is diluted with wash water is returned through a weak white liquor line 23 to the smelt dissolving tank 10.

The strong, turbid filtrate from the first centrifuge 20, comprising mainly a caustic soda solution but containing also from 500 to 1000 parts per million of finely divided calcium carbonate, is passed to a white liquor clarifier 30. The liquor entering the clarifier 30 is dosed with a small quantity of a magnesium compound capable of coagulating the finely divided calcium carbonate in the liquor and of forming a readily settleable precipitate containing magnesium hydroxide and calcium carbonate. Due to the coagulation of the finely divided solids in the filtrate from the first centrifuge the white liquor clarifier 30 can be quite small, as compared with clarifiers heretofore used in the clarification of white liquor.

The following data, taken from actual practice of the invention, may illustrate the results of my process:

Green liquor purified by treating with a magnesium compound to remove its iron content, as described above, was causticized and the causticized liquor passed through a Bird centrifuge. The filtrate from the centrifuge had a suspended solids content of 1000 p. p. m. The calcium carbonate mud from the centrifuge had a moisture content of 34 per cent. The filtrate was dosed with 200 p. p. m. of epsom salts ($MgSO_4 \cdot 7H_2O$) to coagulate the solids and allowed to settle for 60 minutes. The turbidity of the settled liquor was approximately 10 p. p. m. and upon filtration of the settled liquor the turbidity was entirely removed. This compares with turbidities of 30 to 50 p. p. m. as a result of 10 hours settling in the conventional clarification of white liquor.

It will be obvious from the preceding description that the removal of the fine impurities which make the conventional clarification of white liquor so slow and costly, is accelerated in my process by their coagulation with a magnesium compound prior to settling. This is permissible in my process, because the greatest part of the calcium carbonate contained in the white liquor and which must be returned to the causticizing stage, has been removed from the liquor prior to adding the magnesium. In conventional plants where clarification of white liquor is obtained in one step, the fine solids cannot be coagulated without contaminating the calcium carbonate sludge with magnesium and thus make it unsuitable for reuse in the causticizing step.

The clarified white liquor coming from white liquor clarifier 30 is ready for use as cooking liquor. In some cases, especially where the pulp is subsequently bleached, it may be desirable to filter it, as on one or more white liquor filters 31, to remove the last traces of suspended matter. Usually, however, the clarified white liquor can be sent as a cooking liquor from the clarifier 30 to storage or immediate reuse.

The mud from the clarifier 30, containing the precipitated magnesium hydroxide, calcium carbonate and sodium salts, is returned to the smelt dissolving tank 10 where it is mixed with the smelt and weak green liquor from line 15. In the subsequent clarification of the green liquor the quantity of magnesium salts newly added to the green liquor in clarifier 11 can be reduced due to the presence of the recycled magnesium hydroxide. The magnesium hydroxide newly precipitated in the clarifier 11 and the recycled precipitate from clarifier 30 settle together in clarifier 11 and are subsequently washed together in first and second washers 13 and 14, as described, to recover sodium salts.

It will be seen that one aspect of my invention relates to a cyclic process wherein the waste product of one step is used to assist in the treatment in a preceding step. This manner of operation does not only save treating chemicals in the purification of the green liquor but simplifies the recovery of the sodium salts, by combining washing of the sludges from the green liquor clarifier 11 and the white liquor clarifier 30. At the same time the final disposal of the two waste sludges from the two clarifiers is simplified by disposing of them together.

Figure 2 shows diagrammatically another plant for carrying out the invention which is especially suitable for large installations. The green liquor treating stage and the causticizing stage of this embodiment of the invention are the same as in Figure 1, so need not be described. The second step of the white liquor treatment is also the same as described in connection with Figure 1. However, in this embodiment, the first step of my process of white liquor treatment, i. e. the separation of the white liquor into a substantially concentrated and pure calcium carbonate sludge and a turbid liquor containing finely divided calcium carbonate, is carried out in somewhat different manner.

In a plant according to Figure 2, the white liquor coming from the causticizers passes to a white liquor mud concentrator or thickener 40, preferably of the type provided with a conical bottom, as shown. The bulk of the calcium carbonate separates from the liquor in the concentrator 40 in a relatively short time, leaving as overflow a turbid white liquor containing from 500 to 1000 parts suspended solids, consisting mostly of fine particles of calcium carbonate. The mud concentrator 40 can be quite small, as no attempt is made to obtain a clear overflow. The turbid white liquor from concentrator 40 is passed to the white liquor clarifier 30 where it is treated with a magnesium compound to coagulate the fine particles of calcium carbonate and settled, as described in connection with Figure 1. The clarified liquor from white liquor clarifier 30 may be used as cooking liquor with or without previous filtration.

The mud separated in the concentrator 40 has a moisture content of the order of 65% or 70% and must be further dewatered to make it suitable for economical calcining. Preferably, the mud is first washed in a mud washer 41 to recover sodium salts, and then again concentrated in a second concentrator 42. The mud leaving the second concentrator is centrifuged on a continuous centrifuge 43. This results in a mud having a moisture content of the order of 35% which is suitable for calcining.

The filtrate of the centrifuge 43 may be advantageously used as wash water in the mud washer 41 and will pass with the mud from the washer 41 to the second concentrator 42. The overflow of the second mud concentrator 42, constituting weak white liquor carrying valuable sodium salts, is returned through weak white liquor line 23a to the smelt dissolving tank 10 and used for dissolving further quantities of smelt.

It will be obvious from the description of Figure 2, that in this embodiment of my invention where only the sludge is centrifuged, the centrifuge 43 can be much smaller than would be required if the total flow from the causticizers were centrifuged, as in Figure 1. In large installations it is therefore more economical to first separate partially dewatered and concentrated sludge (of a moisture content of 65% to 70%) from the liquor in a sludge concentrator, and subject only the thus separated sludge to centrifuging for further dewatering and concentration.

It will be seen that while the two embodiments of my process differ in the specific manner in which the separation of the white liquor into a concentrated sludge and a turbid liquor is obtained, they both include the essential features of my invention: the separation of the white liquor into a concentrated substantially pure calcium carbonate sludge and a caustic liquor carrying substantial quantities of fine suspended solids, and, in a subsequent and separate treating step, the coagulation of the fine suspended solids by a magnesium compound, and the separation of the precipitated magnesium containing sludge from the clarified white liquor, which sludge may be returned to the green liquor stage of the process. The equipment needed for carrying out either form of the process is cheaper than equipment heretofore used in the conventional practice of white liquor treatment, the settlers are free from moving mechanisms and the cooking liquor obtained in my process is clearer than can be obtained by settling alone, even for prolonged periods.

While I have described my improved treatment of white liquor in connection with the improved treatment of green liquor described above, and best results in the white liquor stage as well as in the process as a whole are obtained by combining these two improvements, I do not wish to limit myself to this combination. The improvement in the white liquor stage which is one of the subject matters of this invention, is obtainable, though to a lesser degree, without the purification of the green liquor by a magnesium compound. The separation of the bulk of the calcium carbonate from the white liquor prior to clarification of the liquor, which permits using a magesium coagulant to enhance the subsequent clarification of the liquor, is of advantage also where the green liquor has not been freed of its iron content prior to causticizing. However, in the presence of iron, settling of the mud in the concentrators 40 and 42 and in the white liquor clarifier 30 will be appreciably slower than when iron free white liquor is treated by my process.

Various modifications of the process described, coming within the scope and spirit of this invention, will suggest themselves to those skilled in the art. Specifically it will be understood that other kinds of apparatus could be used for carrying out the process of my invention. Thus, for instance, a vacuum filter could obviously be substituted for the centrifuge of the first step shown, and the separation of the white liquor into concentrated mud and turbid liquor obtained as well. Further, instead of calcining the mud from the centrifuges 22 and 43 and reusing it in the causticizing stage, fresh lime can be used for causticizing, if desired, and the substantially pure calcium carbonate mud be used as a filler or as a coating pigment. In such case, the mud can be readily bleached, using chlorine or hydrogen peroxide or sodium peroxide. Accordingly, I do not wish to be understood as limiting myself to the exact embodiments shown and described for exemplification and illustration but not for limitation.

I claim:

1. The improvement in the process of preparing a cooking liquor for manufacturing alkaline pulp which comprises subjecting the white liquor formed in the causticizing stage of the process to partial sedimentation, separating partially thickened mud resulting from said partial sedimentation from turbid white liquor, washing the partially thickened mud, subjecting the washed mud to a second partial sedimentation, then centrifuging the partially thickened mud resulting from said second partial sedimentation, returning the centrifuged mud to the kiln of the causticizing stage of the process, using the filtrate from the centrifuging step as wash water in said mud washing step, passing liquid separated from mud in said second partial sedimentation step to a stage of the process preceding the causticizing stage for further treatment therein, adding an inorganic magnesium salt to the turbid white liquor separated from the mud in said first partial sedimentation step to coagulate impurities therein, and separating the coagulated impurities from the clear white liquor which is reused as cooking liquor.

2. In a process of manufacturing alkaline pulp wherein the green liquor formed in the process is purified by treating with a magnesium compound to remove iron therefrom, the precipitated magnesium sludge is washed to recover sodium salts therefrom, the purified green liquor is causticized to form white liquor and the white liquor is clarified, the improvement which comprises centrifuging the white liquor coming from the causticizing step, then coagulating the turbid filtrate of the centrifuging step with a magnesium compound capable of forming in said filtrate a precipitate containing magnesium hydroxide, separating the precipitate from the purified white liquor which is reused as cooking liquor, and returning the precipitate to the green liquor stage of the process to assist in the purification of the green liquor and to recover sodium salts therefrom in the washing step of said green liquor stage conjointly with the recovery of sodium salts from precipitate newly formed in said green liquor stage.

3. In a process of preparing a cooking liquor for the manufacture of alkaline pulp from liquor previously used in such manufacture, the method of treating the white liquor formed in the causticizing stage of the process which comprises first subjecting the white liquor to partial clarification to separate partially clarified white liquor and a substantially pure calcium carbonate mud, further separating liquid containing sodium salts from said mud, returning said liquid to the green liquor stage of the process, returning the mud to the kiln of the causticizing stage, treating the partially clarified white liquor with an inorganic magnesium compound capable of forming in the liquor a flocculant precipitate containing magnesium, and separating the precipitate from the clear white liquor which is reused as cooking liquor.

4. In a process of preparing a cooking liquor for the manufacture of alkaline pulp from liquor previously used in such manufacture, the improvement comprising separating from the white liquor formed in the causticizing stage of the process by causticization of green liquor readily settleable solids in the form of a substantially pure calcium carbonate mud for reuse in the process, then coagulating the fine solids remaining in the white liquor by adding to the white liquor an inorganic magnesium compound capable of forming therein a flocculent precipitate containing magnesium, separating the precipitate from the clarified white liquor which is used as fresh cooking liquor, and returning to the green liquor stage of the process the precipitate containing magnesium hydroxide to remove iron from the green liquor prior to its causticization.

5. In the process of preparing a fresh cooking liquor for alkaline pulp manufacture from previously used cooking liquor, the improvement which comprises subjecting the white liquor formed in the causticizing stage of the process by causticization of green liquor to centrifuging to separate the major portion of its calcium carbonate content from the liquor, returning the centrifuged substantially pure calcium carbonate mud to the kiln of the causticizing stage of the process, dosing the liquor with an inorganic magnesium salt to coagulate fine particles of calcium carbonate and form a readily settleable precipitate containing magnesium hydroxide and calcium carbonate, separating the precipitate from the clarified white liquor which is reused as cooking liquor, and returning the precipitate to the green liquor stage of the process.

JAMES M. KAHN.

REFERENCES CITED

The following references are of record in the file of this patent:

UNITED STATES PATENTS

| Number | Name | Date |
|---|---|---|
| 1,997,691 | Koch | Apr. 16, 1935 |
| 2,012,854 | Hill | Aug. 27, 1935 |
| 2,079,638 | Sindstrom | May 11, 1937 |
| 2,109,250 | Hooker | Feb. 22, 1938 |
| 2,291,833 | Savell | Aug. 4, 1942 |